United States Patent
Jiang et al.

(10) Patent No.: US 8,325,146 B2
(45) Date of Patent: Dec. 4, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 692 days.

(21) Appl. No.: 12/286,184

(22) Filed: Sep. 29, 2008

(65) Prior Publication Data
US 2009/0160798 A1 Jun. 25, 2009

(30) Foreign Application Priority Data
Dec. 21, 2007 (CN) .......................... 2007 1 0125409

(51) Int. Cl.
*G06F 3/041* (2006.01)
(52) U.S. Cl. ...................................................... 345/173
(58) Field of Classification Search .................. 345/173, 345/174; 428/1.4; 313/495, 497, 310, 309, 313/311; 381/164, 426; 349/123, 161, 149, 349/158
See application file for complete search history.

(56) References Cited

U.S. PATENT DOCUMENTS

| | | | |
|---|---|---|---|
| 4,659,873 A | 4/1987 | Gibson et al. |
| 4,922,061 A | 5/1990 | Meadows et al. |
| 4,933,660 A | 6/1990 | Wynne, Jr. |
| 5,181,030 A | 1/1993 | Itaya et al. |
| 5,853,877 A | 12/1998 | Shibuta |
| 5,861,583 A | 1/1999 | Schediwy et al. |
| 5,931,764 A | 8/1999 | Freeman et al. |
| 6,373,472 B1 | 4/2002 | Palalau et al. |
| 6,423,583 B1 | 7/2002 | Avouris et al. |
| 6,628,269 B2 | 9/2003 | Shimizu |
| 6,629,833 B1 | 10/2003 | Ohya et al. |
| 6,914,640 B2 | 7/2005 | Yu |
| 6,947,203 B2 | 9/2005 | Kanbe |
| 7,054,064 B2 | 5/2006 | Jiang et al. |
| 7,060,241 B2 | 6/2006 | Glatkowski |

(Continued)

FOREIGN PATENT DOCUMENTS

| | | |
|---|---|---|
| CN | 2539375 | 3/2003 |

(Continued)

OTHER PUBLICATIONS

Kai-Li Jiang, Qun-Qing Li, Shou-Shan Fan, "Continuous carbon nanotube yarns and their applications", Physics, China, pp. 506-510,Aug. 31, 2003,32(8)(lines from the 4th line to 35th line in the right column of p. 507 may be relevant).

(Continued)

*Primary Examiner* — Nabil Hindi
(74) *Attorney, Agent, or Firm* — Altis Law Group, Inc.

(57) ABSTRACT

A touch panel includes a first electrode plate, and a second electrode plate separated from the first electrode plate. The first electrode plate includes a first substrate, a first conductive layer, and at least two electrodes. The second electrode plate includes a second substrate, a second conductive layer, and at least two electrodes. At least one of the first and second conductive layers includes a plurality of carbon nanotube wire-like structures. Two ends of each carbon nanotube wire-like structure are connected with two of the electrodes. A display device adopting the touch panel includes the touch panel and a display element.

19 Claims, 6 Drawing Sheets

U.S. PATENT DOCUMENTS

| | | | |
|---|---|---|---|
| 7,071,927 B2 | 7/2006 | Blanchard | |
| 7,084,933 B2 | 8/2006 | Oh et al. | |
| 7,194,912 B2 * | 3/2007 | Jordan et al. | 73/774 |
| 7,196,463 B2 * | 3/2007 | Okai et al. | 313/495 |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,355,592 B2 | 4/2008 | Hong et al. | |
| 7,532,182 B2 | 5/2009 | Tseng et al. | |
| 7,593,004 B2 * | 9/2009 | Spath et al. | 345/174 |
| 7,630,040 B2 | 12/2009 | Liu et al. | |
| 7,645,497 B2 * | 1/2010 | Spath et al. | 428/1.4 |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 * | 9/2010 | Irvin et al. | 345/173 |
| 7,825,911 B2 | 11/2010 | Sano et al. | |
| 7,854,992 B2 | 12/2010 | Fu et al. | |
| 7,947,977 B2 | 5/2011 | Jiang et al. | |
| 2002/0089492 A1 | 7/2002 | Ahn et al. | |
| 2003/0122800 A1 | 7/2003 | Yu | |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kavase et al. | |
| 2005/0209392 A1 | 9/2005 | Luo et al. | |
| 2006/0010996 A1 | 1/2006 | Jordan et al. | |
| 2006/0022221 A1 | 2/2006 | Furukawa et al. | |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 | 12/2006 | Spath et al. | |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0085838 A1 | 4/2007 | Ricks et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0007535 A1 | 1/2008 | Li | |
| 2008/0029292 A1 | 2/2008 | Takayama et al. | |
| 2008/0048996 A1 | 2/2008 | Hu et al. | |
| 2008/0088219 A1 | 4/2008 | Yoon et al. | |
| 2008/0095694 A1 | 4/2008 | Nakayama et al. | |
| 2008/0129666 A1 | 6/2008 | Shimotono et al. | |
| 2008/0138589 A1 | 6/2008 | Wakabayashi et al. | |
| 2008/0192014 A1 * | 8/2008 | Kent et al. | 345/173 |
| 2008/0238882 A1 | 10/2008 | Sivarajan et al. | |
| 2008/0248235 A1 | 10/2008 | Feng et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0153513 A1 | 6/2009 | Liu et al. | |
| 2009/0153516 A1 | 6/2009 | Liu et al. | |
| 2009/0167709 A1 | 7/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001975 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |
| JP | S61-231626 | 10/1986 |
| JP | S62-63332 | 3/1987 |
| JP | 62-139028 | 6/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-028090 | 2/1994 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002519754 | 7/2002 |

| | | |
|---|---|---|
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.
George Gruner, "Carbon Nanonets Spark New Electronics", Scientific American, pp. 76-83, May 2007.
Mei Zhang etal., "Strong Transparent, Multifunctional, Carbon Nanotube Sheets", Science, America, AAAS, vol. 309, pp. 1215-1219, Aug. 19, 2005.
Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).
Ri Kurosawa, "Technology Trends of Capacitive Touch Panel", Technology and Development of Touch Panel, AMC, First Impression, pp. 54-64, Dec. 27, 2004(the 6th paragraph on p. 55 may be relevant).
Yagasaki Takuya, Nakanishi Rou, "Resistance Film Type Touch Panel", Technologies and Developments of Touch Panels, AMC, First Impression, pp. 80-93, Dec. 27, 2004(the 2nd Paragraph on p. 81 and the 2nd Paragraph on p. 91 may be relevant).
Wu et al."Transparent, Conductive Carbon Nanotube Films". Science,vol. 305,(2004);pp. 1273-1276.
Susuki et al."Investigation of physical and electric properties of silver pastes as binder for thermoelectric materials". Review of Scientific Instruments,76,(2005);pp. 023907-1 to 023907-5.
Fan et al. "Self-Oriented Regular Arrays of Carbon Nanotubes and Their Field Emission Properties". Science, vol. 283, (1999);pp. 512-514.
ASM Handbook."vol. 2 Properties and Selection: Nonferrous Alloys and Special-Purpose Materials".Apr. 2007; pp. 840-853.
R Colin Johnson, "Carbon nanotubes aim for cheap, durable touch screens",Aug. 2007 http://psroc.phys.ntu.edu.tw/bimonth/v27/615.pdf.
Xianglin Liu, "strong, transparent, multifunctional carbon nanotube sheets", pp. 720~721, Oct. 2005 http://www.eettaiwan.com/articleLogin.do?artId=8800474428&fromWhere=/ART__8800474428__480502__NT__95e7014f.HTM&catId=480502&newsType=NT&pageNo=null&encode=95e7014f.

* cited by examiner

TOUCH PANEL AND DISPLAY DEVICE USING THE SAME

RELATED APPLICATIONS

This application is related to commonly-assigned applications entitled, "TOUCH PANEL", filed on Sep. 29, 2008, and application Ser. No. 12/286,266; "TOUCH PANEL", field on Sep. 29, 2008, and application Ser. No. 12/286,141; "TOUCH PANEL AND DISPLAY DEVICE USING THE SAME", field on Sep. 29, 2008, and application Ser. No. 12/286,189; "TOUCH PANEL AND DISPLAY DEVICE USING THE SAME", field on Sep. 29, 2008, and application Ser. No. 12/286,181; "TOUCH PANEL AND DISPLAY DEVICE USING THE SAME", field on Sep. 29, 2008, and application Ser. No. 12/286,176; "TOUCH PANEL AND DISPLAY DEVICE USING THE SAME", field on Sep. 29, 2008, and application Ser. No. 12/286,166; "TOUCH PANEL AND DISPLAY DEVICE USING THE SAME", field on Sep. 29, 2008, and application Ser. No. 12/286,178; "TOUCH PANEL AND DISPLAY DEVICE USING THE SAME", field on Sep. 29, 2008, and application Ser. No. 12/286,148; "TOUCHABLE CONTROL DEVICE", field on Sep. 29, 2008, and application Ser. No. 12/286,140; "TOUCH PANEL AND DISPLAY DEVICE USING THE SAME", field on Sep. 29, 2008, and application Ser. No. 12/286,154; "TOUCH PANEL AND DISPLAY DEVICE USING THE SAME", field on Sep. 29, 2008, and application Ser. No. 12/286,216; "TOUCH PANEL AND DISPLAY DEVICE USING THE SAME", filed on Sep. 29, 2008, and application Ser. No. 12/286,152; "TOUCH PANEL AND DISPLAY DEVICE USING THE SAME", field on Sep. 29, 2008, and application Ser. No. 12/286,145; "TOUCH PANEL, METHOD FOR MAKING THE SAME, AND DISPLAY DEVICE ADOPTING THE SAME", field on Sep. 29, 2008, and application Ser. No. 12/286,155; "TOUCH PANEL AND DISPLAY DEVICE USING THE SAME", field on Sep. 29, 2008, and application Ser. No. 12/286,146; "TOUCH PANEL, METHOD FOR MAKING THE SAME, AND DISPLAY DEVICE ADOPTING THE SAME", field on Sep. 29, 2008, and application Ser. No. 12/286,228; "TOUCH PANEL AND DISPLAY DEVICE USING THE SAME", field on Sep. 29, 2008, and application Ser. No. 12/286,179; "TOUCH PANEL AND DISPLAY DEVICE USING THE SAME", field on Sep. 29, 2008, and application Ser. No. 12/286,153; "METHOD FOR MAKING TOUCH PANEL", field on Sep. 29, 2008, and application Ser. No. 12/286,175; "METHOD FOR MAKING TOUCH PANEL", field on Sep. 29, 2008, and application Ser. No. 12/286,195; "TOUCH PANEL AND DISPLAY DEVICE USING THE SAME", field on Sep. 29, 2008, and application Ser. No. 12/286,160; "TOUCH PANEL AND DISPLAY DEVICE USING THE SAME", field on Sep. 29, 2008, and application Ser. No. 12/286,220; "TOUCH PANEL AND DISPLAY DEVICE USING THE SAME", field on Sep. 29, 2008, and application Ser. No. 12/286,227; "TOUCH PANEL AND DISPLAY DEVICE USING THE SAME", field on Sep. 29, 2008, and application Ser. No. 12/286,144; "TOUCH PANEL AND DISPLAY DEVICE USING THE SAME", field on Sep. 29, 2008, and application Ser. No. 12/286,218; "TOUCH PANEL AND DISPLAY DEVICE USING THE SAME", field on Sep. 29, 2008, and application Ser. No. 12/286,142; "TOUCH PANEL AND DISPLAY DEVICE USING THE SAME", field on Sep. 29, 2008, and application Ser. No. 12/286,241; "TOUCH PANEL, METHOD FOR MAKING THE SAME, AND DISPLAY DEVICE ADOPTING THE SAME", field on Sep. 29, 2008, and application Ser. No. 12/286,151; "ELECTRONIC ELEMENT HAVING CARBON NANOTUBES", filed on Sep. 29, 2008, and application Ser. No. 12/286,143; and "TOUCH PANEL, METHOD FOR MAKING THE SAME, AND DISPLAY DEVICE ADOPTING THE SAME", field on Sep. 29, 2008, and application Ser. No. 12/286,219. The disclosures of the above-identified applications are incorporated herein by reference.

BACKGROUND

1. Field of the Invention

The present invention relates to a carbon nanotube based touch panel, and a display device incorporating the touch panel.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, a stylus, or a like tool while visually observing the display device through the touch panel. Therefore, a demand exists for touch panels that are superior in visibility and reliable in operation.

At present, different types of touch panels, including resistance, capacitance, infrared, and surface sound-wave types have been developed. Due to their high accuracy and low cost of production, resistance-type touch panels have been widely used.

A conventional resistance-type touch panel includes an upper substrate, a transparent upper conductive layer formed on a lower surface of the upper substrate, a lower substrate, a transparent lower conductive layer formed on an upper surface of the lower substrate, and a plurality of dot spacers formed between the transparent upper conductive layer and the transparent lower conductive layer. The transparent upper conductive layer and the transparent lower conductive layer are formed of electrically conductive indium tin oxide (ITO).

In operation, an upper surface of the upper substrate is pressed with a finger, a pen, or a like tool, and visual observation of a screen on the liquid crystal display device provided on a back side of the touch panel is provided. This causes the upper substrate to be deformed, and the upper conductive layer thus comes in contact with the lower conductive layer at the position where the pressing occurs. Voltages are separately applied by an electronic circuit to the transparent upper conductive layer and the transparent lower conductive layer. Thus, the deformed position can be detected by the electronic circuit.

Each of the transparent conductive layers (e.g., ITO layers) is generally formed by means of ion-beam sputtering, and this method is relatively complicated. Additionally, the ITO layer has poor wearability/durability, low chemical endurance, and uneven resistance over an entire area of the touch panel. Furthermore, the ITO layer has relatively low transparency. All the above-mentioned problems of the ITO layer make for a touch panel with low sensitivity, accuracy, and brightness.

What is needed, therefore, is to provide a durable touch panel and a display device using the same with high sensitivity, accuracy, and brightness.

SUMMARY

In one embodiment, a touch panel includes a first electrode plate, and a second electrode plate separated from the first electrode plate. The first electrode plate includes a first substrate, a first conductive layer, and at least two electrodes. The first conductive layer and the at least two electrodes are located on a lower surface of the first substrate. The at least two electrodes are located on the first electrode plate and electrically connected with the first conductive layer. The second electrode plate includes a second substrate, a second conductive layer, and at least two electrodes. The second conductive layer and the at least two electrodes are located on an upper surface of the second substrate. The at least two electrodes are located on the second electrode plate and electrically connected with the second conductive layer. At least one of the first and second conductive layers includes a plurality of carbon nanotube wire-like structures. Two ends of each carbon nanotube wire-like structure are connected with two of the electrodes.

Other novel features and advantages of the present touch panel and display device using the same will become more apparent from the following detailed description of exemplary embodiments, when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Corresponding reference characters indicate corresponding parts throughout the views. The exemplifications set out herein illustrate at least one embodiment of the present touch panel and display device using the same, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel and display device using the same.

Figure 1:
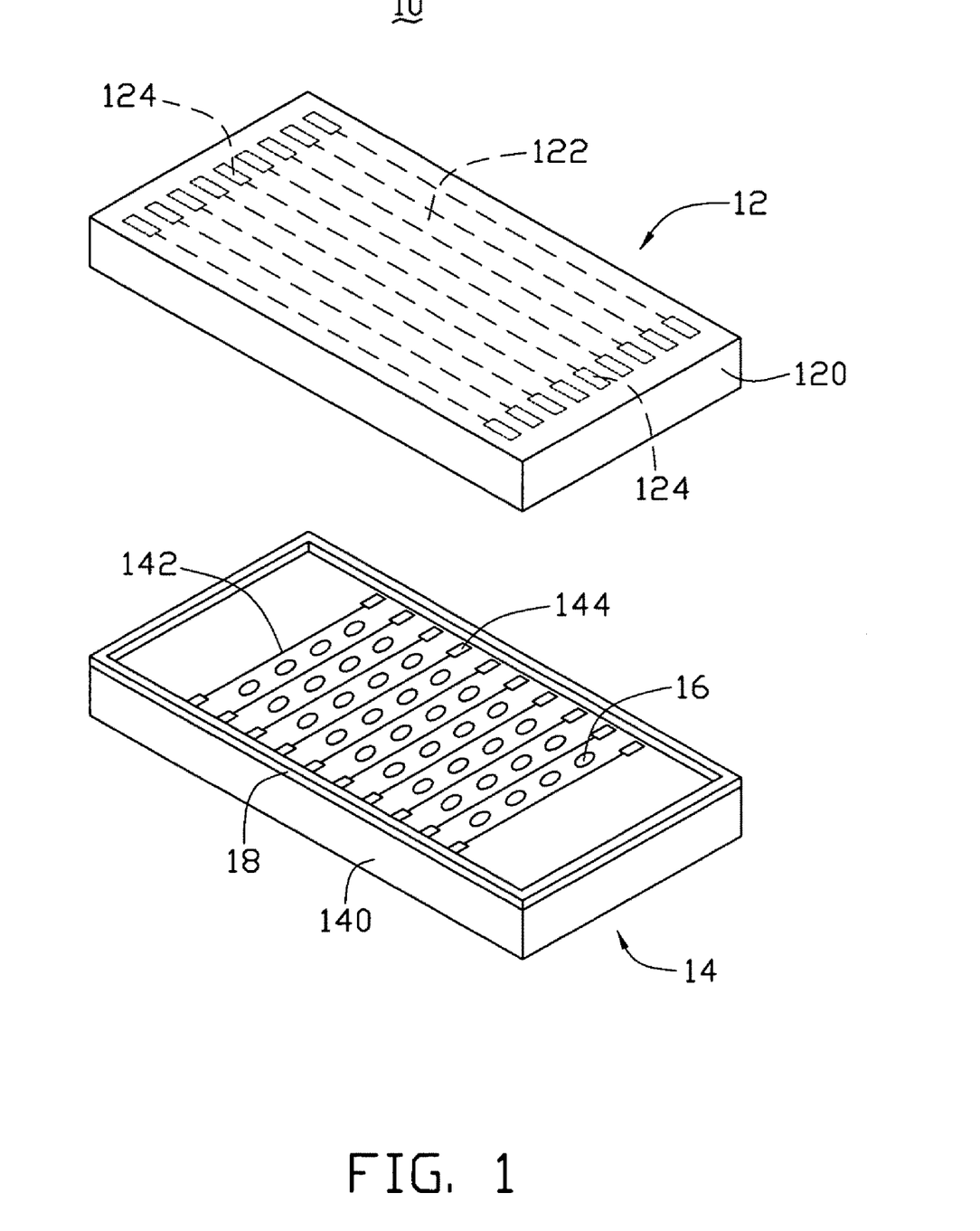
FIG. 1 is an exploded, isometric view of a touch panel in accordance with a present embodiment, showing a first electrode plate thereof inverted.
Figure 2:
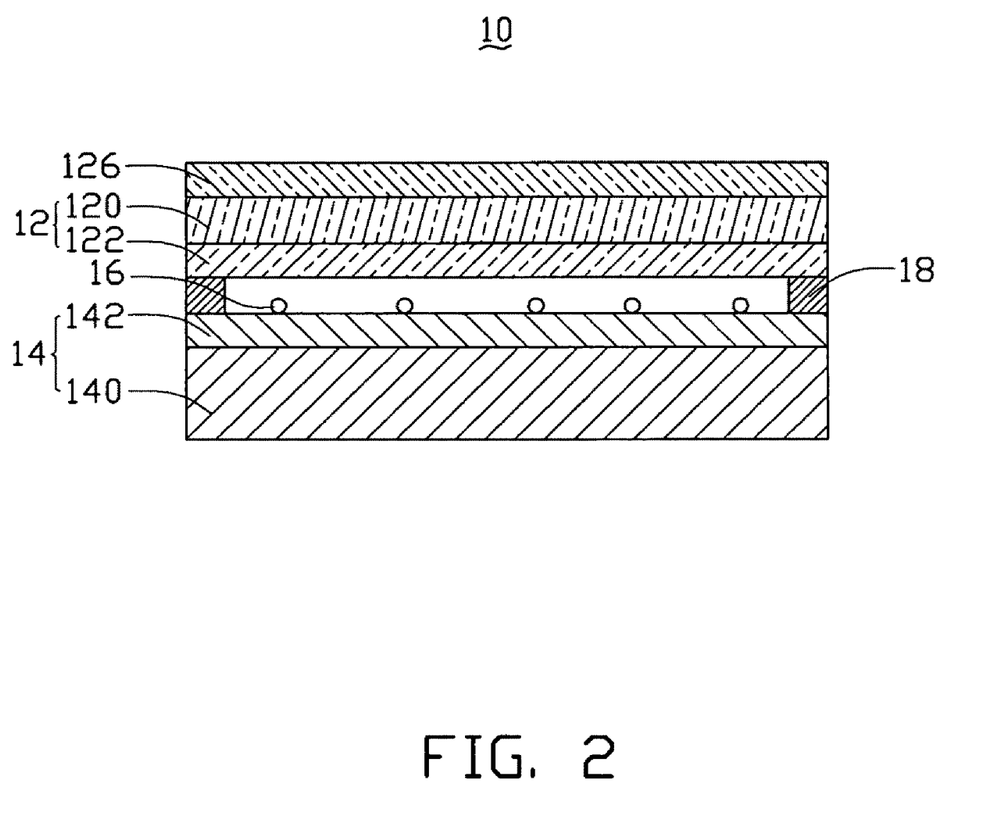
FIG. 2 is a side cross-sectional view of the touch panel of FIG. 1 once assembled.

Referring to FIG. 1 and FIG. 2, a touch panel 10 includes a first electrode plate 12, a second electrode plate 14, and a plurality of dot spacers 16 located between the first electrode plate 12 and the second electrode plate 14.

The first electrode plate 12 includes a first substrate 120, a first conductive layer 122, and at least two first-electrodes 124. The first substrate 120 has an upper surface and a lower surface, and the upper surface and the lower surface are substantially flat. In the illustrated embodiment, there are multiple first-electrodes 124. The first-electrodes 124 and the first conductive layer 122 are located on the lower surface of the first substrate 120. The first-electrodes 124 are arranged in two parallel columns at opposite ends of the lower surface of the first substrate 120, and are electrically connected with the first conductive layer 122. The first conductive layer 122 is arranged on the lower surface of the first substrate 120. That is, the two columns of first-electrodes 124 are located at opposite ends of the first conductive layer 122 respectively. A direction from one of the columns of first-electrodes 124 across the first conductive layer 122 to the other column of first-electrodes 124 is defined as a first direction.

The second electrode plate 14 includes a second substrate 140, a second conductive layer 142, and at least two second-electrodes 144. The second substrate 140 includes an upper surface and a lower surface, and the upper surface and the lower surface are substantially flat. In the illustrated embodiment, there are multiple second-electrodes 144. The second-electrodes 144 and the second conductive layer 142 are located on the upper surface of the second substrate 140. The second-electrodes 144 are arranged in two parallel columns at opposite ends of the upper surface of the second substrate 140 respectively, and are electrically connected with the second conductive layer 142. The second conductive layer 142 is arranged on a major portion of the upper surface of the second substrate 140. That is, the two columns of second-electrodes 144 are located at opposite ends of the second conductive layer 142 respectively. A direction from one of the columns of second-electrodes 144 across the second conductive layer 142 to the other column of second-electrodes 144 is defined as a second direction.

The first direction is perpendicular to the second direction; i.e., the columns of first-electrodes 124 are orthogonal to the columns of second-electrodes 144. The first substrate 120 is a transparent and flexible film/plate. The second substrate 140 is a transparent plate. The first-electrodes 124 and the second-electrodes 144 are made of metal or any other suitable conductive material. In the present embodiment, the first substrate 120 is a polyester film, the second substrate 140 is a glass plate, and the first-electrodes 124 and the second-electrodes 144 are made of a conductive silver paste.

An insulative layer 18 is provided between the first and second substrates 120, 140. In the illustrated embodiment, the insulative layer 18 is in the form of a rectangular bead. The first electrode plate 12 is located on the insulative layer 18. That is, the first conductive layer 122 faces, but is spaced from, the second conductive layer 142. The dot spacers 16 are located on the second conductive layer 142. A distance between the second electrode plate 14 and the first electrode plate 12 is typically in an approximate range from 2 to 20 microns. The insulative layer 18 and the dot spacers 16 are made of, for example, insulative resin or any other suitable insulative material. Electrical insulation between the first electrode plate 12 and the second electrode plate 14 is provided by the insulative layer 18 and the dot spacers 16. It is to be understood that the dot spacers 16 are optional, particularly when the size of the touch panel 10 is relatively small.

In the present embodiment, a transparent protective film 126 is located on the upper surface of the first electrode plate 12. The material of the transparent protective film 126 can be selected from a group consisting of silicon nitrides, silicon dioxides, benzocyclobutenes, polyester films, and polyethylene terephthalates. For example, the transparent protective film 126 can be made of slick plastic and receive a surface hardening treatment to protect the first electrode plate 12 from being scratched when in use.

Figure 3:
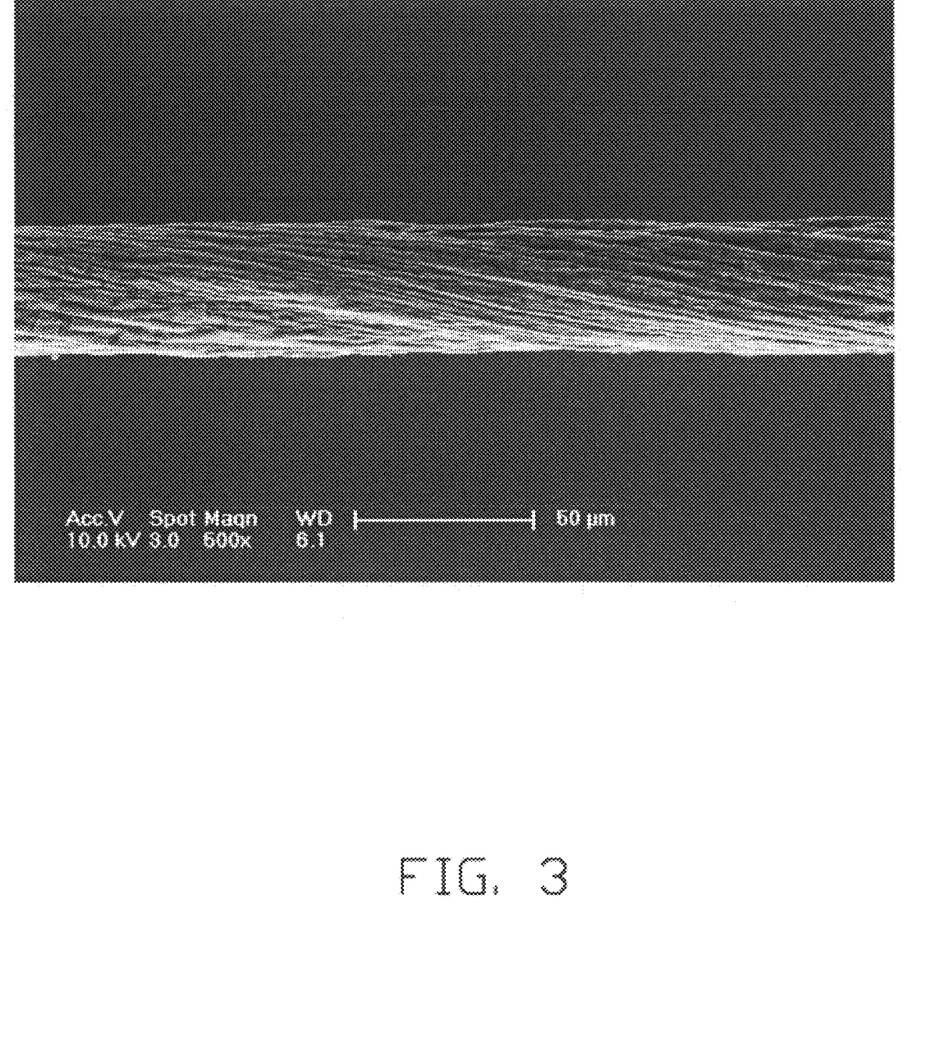
FIG. 3 shows a Scanning Electron Microscope (SEM) image of a carbon nanotube wire-like structure used in the touch panel of FIG. 1.

At least one of the first conductive layer 122 and the second conductive layer 142 includes a plurality of carbon nanotube wire-like structures. A plurality of the first-electrodes 124 and/or the second-electrodes 144 is located on opposite ends of the corresponding electrode plate 12, 14 having the plurality of carbon nanotube wire-like structures formed thereon. Two ends of each carbon nanotube wire-like structure are connected with two opposite first-electrodes 124 and/or second-electrodes 144 respectively. That is, each corresponding first-electrode 124 and/or second-electrode 144 is connected with the end of at least one carbon nanotube wire-like structure. The carbon nanotube wire-like structure can be a carbon nanotube wire. Referring to FIG. 3, each carbon nanotube wire is comprised of a plurality of successive carbon nanotubes joined end to end by van der Waals attractive force therebetween. Lengths of the carbon nanotube wires can be arbitrarily set as desired. The carbon nanotube wires can be parallel to and spaced apart from each other. A diameter of each carbon nanotube wire is in an approximate range from 0.5 nanometers to 100 micrometers (μm). Distances between adjacent carbon nanotube wires are in an approximate range from 10 nanometers to 1 millimeter. The carbon nanotubes in the carbon nanotube wires can be selected from a group consisting of single-walled, double-walled, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers.

In the present embodiment, the first conductive layer 122 and the second conductive layer 142 both include a plurality of carbon nanotube wire-like structures. The carbon nanotube wire-like structure is a carbon nanotube wire. The carbon nanotube wires are parallel to each other and spaced apart from each other. The carbon nanotube wires in the first conductive layer 122 cross the carbon nanotube wires in the second conductive layer 142. That is, the carbon nanotube wires in the first conductive layer 122 are aligned along the first direction, and the carbon nanotube wires in the second conductive layer 142 are aligned along the second direction. In this embodiment, the first direction is perpendicular to the second direction. In other embodiments, the first direction can be set at an angle other than perpendicular (oblique) to the second direction.

A method for fabricating the above-described first conductive layer 122 and second conductive layer 142 includes the steps of: (a) providing an array of carbon nanotubes or providing a super-aligned array of carbon nanotubes; (b) pulling out a carbon nanotube structure from the array of carbon nanotubes, by using a tool (e.g., adhesive tape, pliers, tweezers, or another tool allowing multiple carbon nanotubes to be gripped and pulled simultaneously); and (c) treating the carbon nanotube structure with an organic solvent or mechanical force to form a carbon nanotube wire; and (d) placing a plurality of the carbon nanotube wires in parallel and space apart from one another on each of the first substrate 120 and the second substrate 140, thereby forming a first conductive layer 122 on the first substrate 120 and a second conductive layer 142 on the second substrate 140.

The method of fabricating a nanotube film comprises steps (a) and (b). A nanotube film can be used as a shielding layer.

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in an approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. In this embodiment, a 4-inch P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen (N2), ammonia (NH3), and a noble gas. In step (a5), the carbon source gas can be a hydrocarbon gas, such as ethylene (C2H4), methane (CH4), acetylene (C2H2), ethane (C2H6), or any combination thereof.

The super-aligned array of carbon nanotubes can have a height of about 50 microns to 5 millimeters and include a plurality of carbon nanotubes parallel to each other and approximately perpendicular to the substrate. The carbon nanotubes in the array of carbon nanotubes can be selected from a group consisting of single-walled carbon nanotubes, double-walled carbon nanotubes, and multi-walled carbon nanotubes. A diameter of each single-walled carbon nanotube approximately ranges from 0.5 nanometers to 50 nanometers. A diameter of each double-walled carbon nanotube approximately ranges from 1 nanometer to 50 nanometers. A diameter of each multi-walled carbon nanotube approximately ranges from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by the van der Waals attractive force.

In step (b), the carbon nanotube structure can be formed by the substeps of: (b1) selecting a plurality of carbon nanotube segments having a predetermined width from the array of carbon nanotubes; and (b2) pulling the carbon nanotube segments at an even/uniform speed to achieve a uniform carbon nanotube structure.

Figure 4:
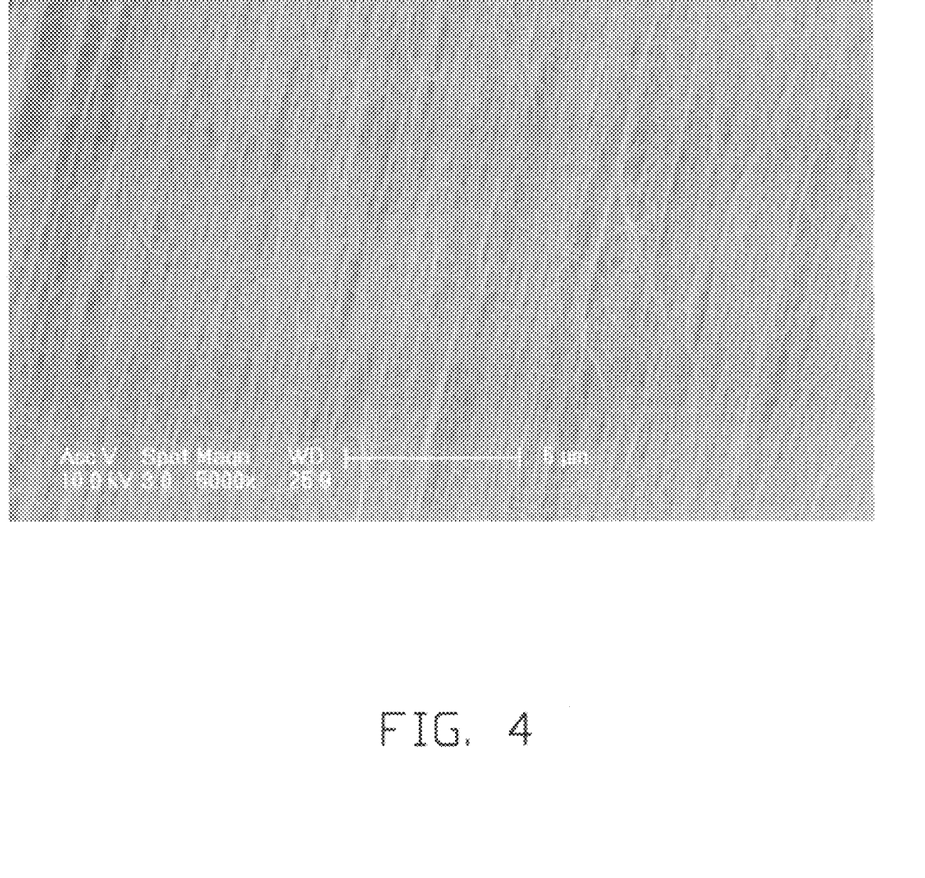
FIG. 4 shows a Scanning Electron Microscope (SEM) image of a carbon nanotube film.
Figure 5:
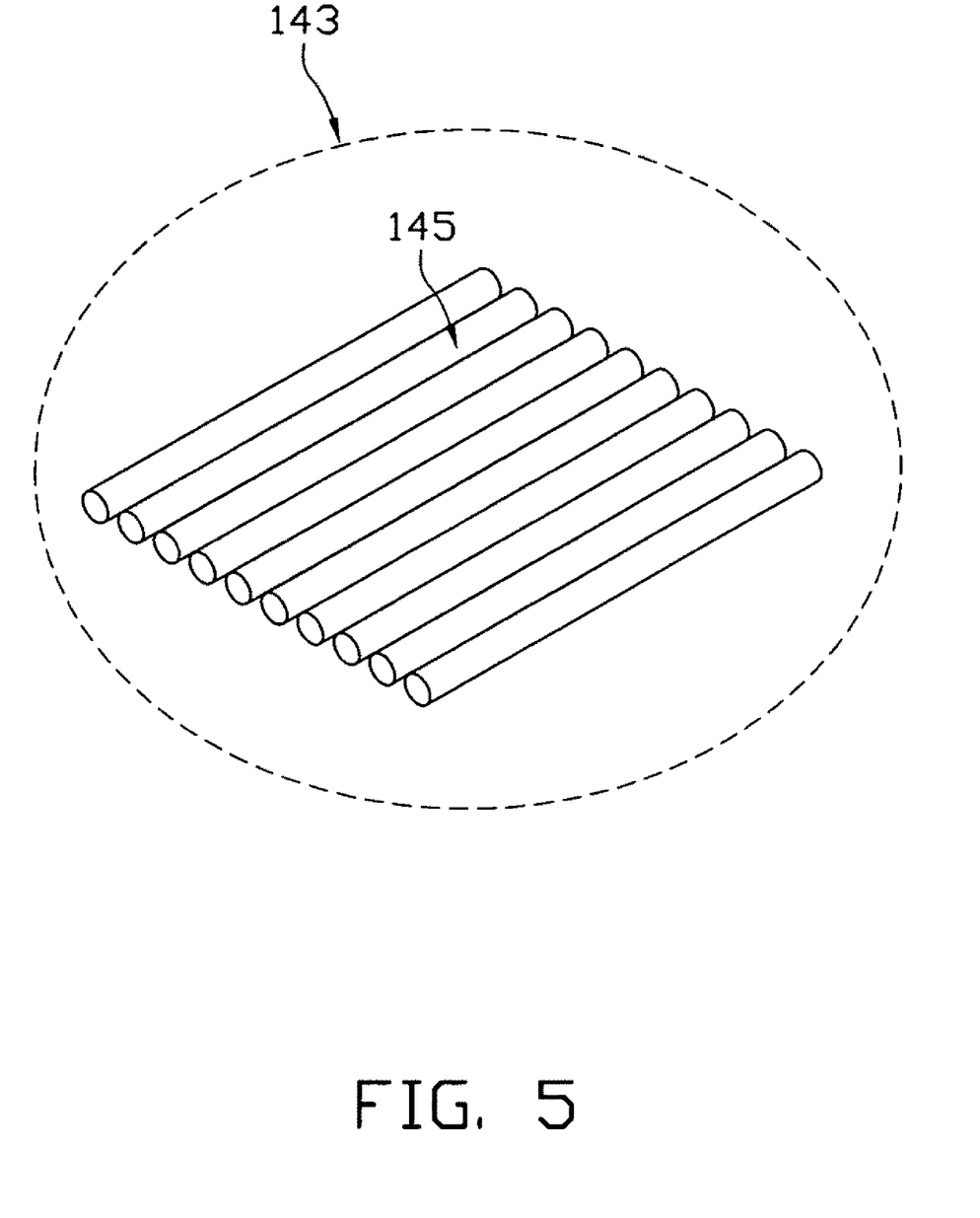
FIG. 5 is a structural schematic of a carbon nanotube segment.

In step (b1), the carbon nanotube segments can be selected by using a tool, such as adhesive tapes, pliers, tweezers, or another tools allowing multiple carbon nanotubes to be gripped and pulled simultaneously to contact with the super-aligned array. Referring to FIG. 4 and FIG. 5, each carbon nanotube segment 143 includes a plurality of carbon nanotubes 145 parallel to each other, and combined by van der Waals attractive force therebetween. The carbon nanotube segments 145 can vary in width, thickness, uniformity and shape. In step (b2), the pulling direction is substantially perpendicular to the growing direction of the super-aligned array of carbon nanotubes.

More specifically, during the pulling process, as the initial carbon nanotube segments 143 are drawn out, other carbon nanotube segments 143 are also drawn out end to end due to the van der Waals attractive force between ends of adjacent carbon nanotube segments 143. This process of drawing ensures a continuous, uniform carbon nanotube structure can be formed. The pulling/drawing method is simple, fast, and suitable for industrial applications.

In step (c), the carbon nanotube structure is soaked in an organic solvent. Since the untreated carbon nanotube structure is composed of a number of carbon nanotubes 145, the untreated carbon nanotube structure has a high surface area to volume ratio and thus may easily become stuck to other objects. During the surface treatment, the carbon nanotube structure is shrunk into a carbon nanotube wire after the organic solvent volatilizing, due to factors such as surface tension. The surface area to volume ratio and diameter of the treated carbon nanotube wire is reduced. Accordingly, the stickiness of the carbon nanotube structure is lowered, and strength and toughness of the carbon nanotube structure is improved. The organic solvent may be a volatilizable organic solvent, such as ethanol, methanol, acetone, dichloroethane, chloroform, and any combination thereof. A diameter of the carbon nanotube wires approximately ranges from 0.5 nanometers to 100 micrometers ($\mu m$).

In step (c), the carbon nanotube structure also can be treated with mechanical force (e.g., a conventional spinning process), to acquire a carbon nanotube wire in a twisted shape.

In step (d), the distances between the adjacent carbon nanotube wires can be set according to the desired optical transparency properties of the touch panel 10. In the present embodiment, the distances between the adjacent carbon nanotube wires are in an approximate range from 10 nanometers to 1 millimeter. Further, all the adjacent carbon nanotube wires are spaced apart a same distance.

Two ends of each of the carbon nanotube wires in the first conductive layer 122 are connected with two corresponding opposite first-electrodes 124, and two ends of each of the carbon nanotube wires in the second conductive layer 142 are connected with two corresponding opposite second-electrodes 144. Each first-electrode 124 and second-electrode 144 is connected with the end of at least one carbon nanotube wire. In the present embodiment, each first-electrode 124 is connected with the end of only one carbon nanotube wire in the first conductive layer 122, and each second-electrode 144 is connected with the end of only one carbon nanotube wire in the second conductive layer 142. In this embodiment, the carbon nanotube wires in the first conductive layer 122 are spaced apart, and each carbon nanotube wire is arranged along the first direction. Alternatively, each carbon nanotube wire in the first conductive layer 122 can stray from the first direction. In this embodiment, the carbon nanotube wires in the second conductive layer 142 are spaced apart, and each carbon nanotube wire is arranged along the second direction. The first direction is perpendicular to the second direction. Alternatively, each carbon nanotube wire in the second conductive layer 142 can deflect from the second direction. The plurality of first-electrodes 124 and second-electrodes 144 are connected with a circuit of the touch panel 10 via electrode down-leads.

Figure 6:
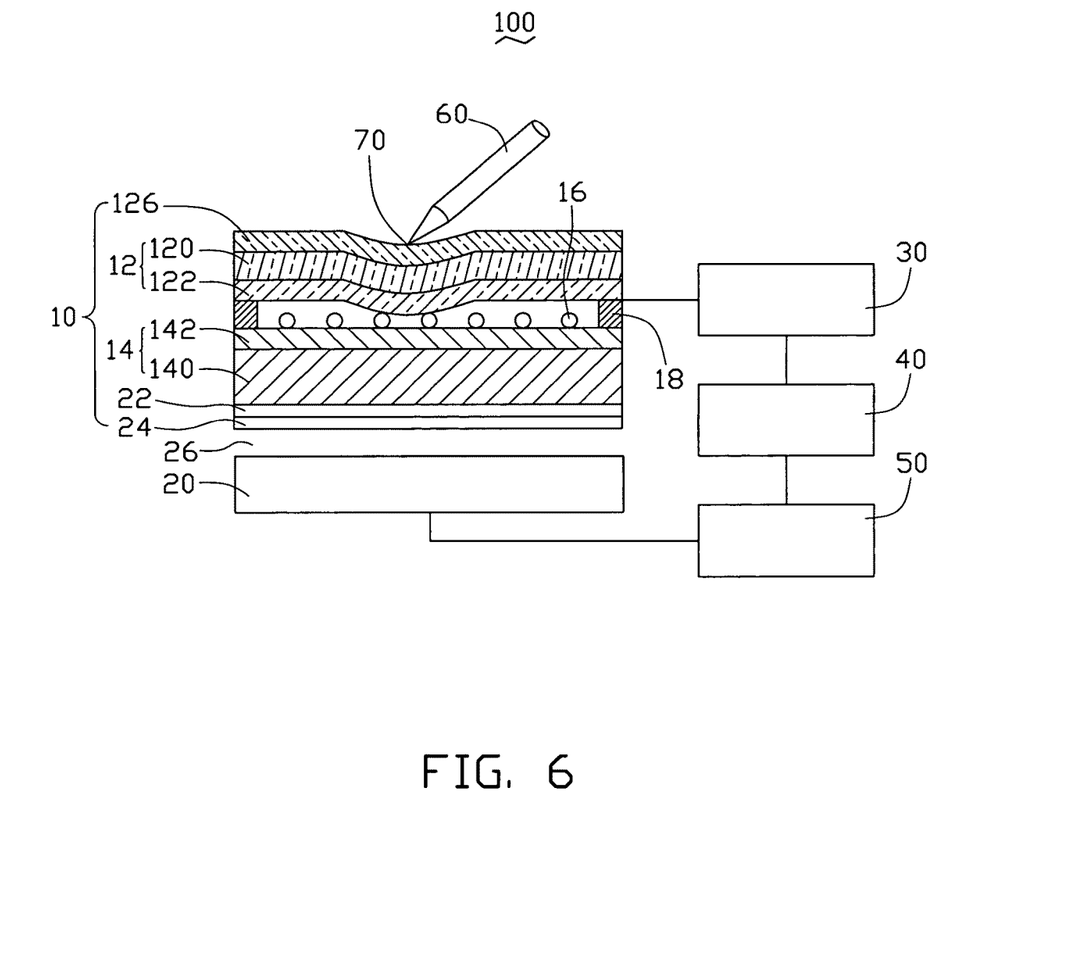
FIG. 6 is essentially a schematic cross-sectional view of the touch panel of the present embodiment used with a display element of a display device, showing operation of the touch panel with a touch tool.

Referring also to FIG. 6, the touch panel 10 can further include a shielding layer 22 located on the lower surface of the second substrate 140. The material of the shielding layer 22 can be selected from a group consisting of indium tin oxides, antimony tin oxides, carbon nanotube films, and other conductive materials. In the present embodiment, the shielding layer 22 is a carbon nanotube film. The carbon nanotube film includes a plurality of carbon nanotubes, and the orientations of the carbon nanotubes therein can be arbitrarily set as desired. In this embodiment, the carbon nanotubes in the carbon nanotube film of the shielding layer 22 are arranged along a same direction. The carbon nanotube film is connected to ground and acts as a shield, thus enabling the touch panel 10 to operate without interference (e.g., electromagnetic interference).

An exemplary display device 100 includes the touch panel 10, a display element 20, a first controller 30, a central processing unit (CPU) 40, and a second controller 50. The touch panel 10 is opposite and adjacent to the display element 20, and is connected to the first controller 30 by a circuit external to the touch panel 10. The touch panel 10 can be spaced from the display element 20 or installed directly on the display element 20. In the present embodiment, the touch panel 10 is spaced from the display element 20. That is, the touch panel 10 and the display element 20 are spaced apart and separated by a gap 26. The first controller 30, the CPU 40, and the second controller 50 are electrically connected. In particular, the CPU 40 is connected to the second controller 50 to control the display element 20.

The display element 20 can be, e.g., a liquid crystal display, a field emission display, a plasma display, an electroluminescent display, a vacuum fluorescent display, a cathode ray tube, or another display device.

When the shielding layer 22 is located on the lower surface of the second substrate 140, a passivation layer 24 is located on a surface of the shielding layer 22 that faces away from the second substrate 140. The material of the passivation layer 24 can, for example, be silicon nitride or silicon dioxide. The passivation layer 24 can protect the shielding layer 22 from chemical or mechanical damage.

In typical operation of the display device 100, a 5V (volts) voltage is applied to the two columns of first-electrodes 124 of the first electrode plate 12, and to the two columns of second-electrodes 144 of the second electrode plate 14. A user operates the display device 100 by pressing the first electrode plate 12 of the touch panel 10 with a finger 60, a pen/stylus 60, or the like, while visually observing the display element 20 through the touch panel 10. This pressing causes a deformation 70 of the first electrode plate 12. The deformation 70 of the first electrode plate 12 establishes an electrical connection between the first conductive layer 122 of the first electrode plate 12 and the second conductive layer 142 of the second electrode plate 14. Changes in voltages along the first direction of the first conductive layer 122 and along the second direction of the second conductive layer 142 can be detected by the first controller 30. Then the first controller 30 transforms the changes in voltages into coordinates of the pressing point, and sends the coordinates to the CPU 40. The CPU 40 then sends out commands according to the coordinates of the pressing point. Thereby, the user can control the display of the display element 20.

The properties of the carbon nanotubes provide superior toughness, high mechanical strength, and uniform conductivity to the carbon nanotube wire-like structures derived from the carbon nanotube films and/or yarns. Thus, the touch panel 10 and the display device 100 adopting the carbon nanotube wire-like structures as the first and second conductive layers 122, 142 are durable and highly conductive. Furthermore, since the carbon nanotubes have excellent electrical conductivity properties, each of the first and second conductive layers 122, 142 formed by the plurality of spaced-apart carbon nanotube wire-like structures parallel to each other has a uniform resistance distribution and uniform optical transparency. Thus the touch panel 10 and the display device 100 adopting the carbon nanotube wire-like structures have improved sensitivity and accuracy. Furthermore, since each first-electrode 124 and second-electrode 144 is connected with the end of at least one corresponding carbon nanotube wire-like structure, the determination of the position of the pressing point by detecting the voltage changes between the corresponding pairs of opposite electrodes 124, 144 can be highly accurate. That is, the touch panel 10 and the display device 100 can provide operation with very high precision.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A touch panel comprising:
a first electrode plate comprising a first substrate, a first conductive layer located on a lower surface of the first substrate, and a plurality of first electrodes located on the first electrode plate and electrically connected with the first conductive layer; and
a second electrode plate separated from the first electrode plate and comprising a second substrate, a second conductive layer located on an upper surface of the second substrate, and a plurality of second electrodes located on the second electrode plate and electrically connected with the second conductive layer;
at least one of the first and the second conductive layers comprising a plurality of carbon nanotube wire-like structures substantially parallel to each other, wherein each of the plurality of carbon nanotube wire-like structures comprises a plurality of carbon nanotubes; and
each of the plurality of first electrodes is electrically connected with one end of only one of the plurality of carbon nanotube wire-like structures of the first conductive layer, and each of the plurality of second electrodes is electrically connected with one end of only one of the plurality of carbon nanotube wire-like structures of the second conductive layer.

2. The touch panel as claimed in claim 1, wherein the carbon nanotube wire-like structures are spaced apart from each other, and distances between adjacent carbon nanotube wire-like structures are in an approximate range from 10 nanometers to 1 millimeter.

3. The touch panel as claimed in claim 1, wherein both the first and the second conductive layers comprise a plurality of carbon nanotube wire-like structures, the plurality of first electrodes are located on the first conductive layer, and each of the plurality of first electrodes is electrically connected with one end of only one of the plurality of carbon nanotube wire-like structures of the first conductive layer; a first direction is defined by the plurality of first electrodes located on the first conductive layer; the plurality of second electrodes are located on the second conductive layer, and each of the plurality of second electrodes is electrically connected with one end of only one of the plurality of carbon nanotube wire-like structures of the second conductive layer; and a second direction is defined by the plurality of second electrodes located on the second conductive layer.

4. The touch panel as claimed in claim 3, wherein the carbon nanotube wire-like structures of the first conductive layer cross the carbon nanotube wire-like structures of the second conductive layer.

5. The touch panel as claimed in claim 4, wherein the carbon nanotube wire-like structures of the first conductive layer are aligned along the first direction, and the carbon nanotube wire-like structures of the second conductive layer are aligned along the second direction.

6. The touch panel as claimed in claim 5, wherein the first direction is substantially perpendicular to the second direction.

7. The touch panel as claimed in claim 1, wherein a diameter of each carbon nanotube wire-like structure is in an approximate range from 0.5 nanometers to 100 micrometers.

8. The touch panel as claimed in claim 1, wherein the carbon nanotube wire-like structure is a carbon nanotube wire, and the plurality of carbon nanotubes in the carbon nanotube wire are successively joined end to end by van der Waals attractive force.

9. The touch panel as claimed in claim 1, further comprising an insulative layer located between peripheral edges of the first and the second electrode plates.

10. The touch panel as claimed in claim 9, wherein a plurality of dot spacers are located between the first conductive layer of the first electrode plate and the second conductive layer of the second electrode plate.

11. The touch panel as claimed in claim 1, further comprising a shielding layer located on a lower surface of the second substrate of the second electrode plate, a material of the shielding layer being at least one item selected from the group consisting of indium tin oxides, antimony tin oxides, and carbon nanotube films.

12. The touch panel as claimed in claim 1, further comprising a transparent protective film located on an upper surface of the first electrode plate, a material of the transparent protective film being at least one item selected from the group consisting of silicon nitrides, silicon dioxides, benzocyclobutenes, polyester films, and polyethylene terephthalates.

13. A display device comprising:
a touch panel comprising:
a first electrode plate and a second electrode plate,
the first electrode plate comprising a first substrate, a first conductive layer located on a lower surface of the first substrate, and at least two electrodes located on the first electrode plate and electrically connected with the first conductive layer, and
the second electrode plate separated from the first electrode plate and comprising a second substrate, a second conductive layer located on an upper surface of the second substrate, and at least two electrodes located on the second electrode plate and electrically connected with the second conductive layer,
at least one of the first and the second conductive layers comprising a plurality of carbon nanotube wire-like structures substantially parallel to each other, wherein each of the plurality of carbon nanotube wire-like structures comprises a plurality of carbon nanotube segments comprising a plurality of carbon nanotubes substantially parallel to each other and combined with each other by van der Waals attractive force, the plurality of carbon nanotube segments are joined end to end by van der Waals attractive force, and each end of each of the plurality of carbon nanotube wire-like structures is connected with one of the at least two electrodes; and
a display element adjacent to the touch panel.

14. The display device as claimed in claim 13, further comprising a first controller, a central processing unit, and a second controller; wherein the display element is connected to the first controller, and the central processing unit is connected to the second controller.

15. The display device as claimed in claim 13, wherein the touch panel is located on the display element.

16. The display device as claimed in claim 13, further comprising a passivation layer located on a surface of the touch panel, and a material of the passivation layer being selected from the group consisting of silicon nitride and silicon dioxide.

17. The touch panel as claimed in claim 13, wherein each of the at least two electrodes is directly connected with one end of only one of the plurality of carbon nanotube wire-like structures.

18. A touch panel comprising:
a first electrode plate comprising a first substrate, a first conductive layer located on a lower surface of the first substrate, and at least two electrodes located on the first electrode plate and electrically connected with the first conductive layer; and
a second electrode plate, separated from the first electrode plate, comprising a second substrate, a second conductive layer located on an upper surface of the second substrate, and at least two electrodes located on the second electrode plate and electrically connected with the second conductive layer;
at least one of the first and the second conductive layers comprises a plurality of carbon nanotube wire-like structures substantially parallel to each other and spaced from each other, wherein each of the plurality of carbon nanotube wire-like structures comprises a plurality of carbon nanotubes, and a distance between each adjacent ones of the plurality of carbon nanotube wire-like structures is in an approximate range from 10 nanometers to 1 millimeter; and
each end of each of the plurality of carbon nanotube wire-like structures is connected with one of the at least two electrodes of the at least one of the first and the second conductive layers.

19. The touch panel as claimed in claim 18, wherein the plurality of carbon nanotubes are joined end to end by van der Waals attractive force.

* * * * *